United States Patent
Sebastian

(10) Patent No.: US 9,822,750 B2
(45) Date of Patent: Nov. 21, 2017

(54) VALVE FOR METERING IN A FLOWING MEDIUM

(71) Applicant: Robert Bosch GmbH, Stuttgart (DE)

(72) Inventor: Thomas Sebastian, Erdmannhausen (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/359,626

(22) PCT Filed: Oct. 4, 2012

(86) PCT No.: PCT/EP2012/069565
§ 371 (c)(1),
(2) Date: May 21, 2014

(87) PCT Pub. No.: WO2013/075876
PCT Pub. Date: May 30, 2013

(65) Prior Publication Data
US 2015/0102241 A1    Apr. 16, 2015

(30) Foreign Application Priority Data

Nov. 24, 2011  (DE) .................. 10 2011 087 005

(51) Int. Cl.
*F16K 31/02*    (2006.01)
*F02M 51/06*    (2006.01)
(Continued)

(52) U.S. Cl.
CPC .... *F02M 63/0026* (2013.01); *F02M 51/0603* (2013.01); *F02M 61/08* (2013.01);
(Continued)

(58) Field of Classification Search
CPC .... F02M 51/0603; F02M 61/08; F02M 61/10; F02M 61/20; F02M 63/0026; F16K 31/007
(Continued)

(56) References Cited

U.S. PATENT DOCUMENTS 2,391,808  A  *  12/1945  Vincent .................. F02M 61/10
                                                     137/510
4,803,393  A  *  2/1989   Takahashi .............. F02M 47/02
                                                     123/478

(Continued)

FOREIGN PATENT DOCUMENTS

DE    EP 1457662 A1  *  9/2004  ........... F02M 1/0603
DE    FR 2941270 A1  *  7/2010  ............. F02D 41/20

(Continued)

OTHER PUBLICATIONS

International Search Report, PCT International Application No. PCT/EP2012/069565, dated Feb. 15, 2013.

*Primary Examiner* — Seth W MacKay-Smith
(74) *Attorney, Agent, or Firm* — Norton Rose Fulbright US LLP; Gerard Messina

(57) ABSTRACT

A valve for metering a flowing medium, in particular a fluid, having a metering opening situated in the fluid flow and surrounded by a valve seat, a valve needle that controls the metering opening and that has a closing head that works together with the valve seat to close and release the metering opening, a piezoelectric actuator that acts on the valve needle to release the metering opening, and an elastic resetting element that acts on the valve needle to close the metering opening. To minimize the required stroke of the piezoelectric actuator for a required stroke of the closing head of the valve needle, the point of action of the resetting
(Continued)

element on the valve needle is situated on or close to the end of the valve needle that bears the closing head.

9 Claims, 2 Drawing Sheets

(51) Int. Cl.
    *F02M 61/08* (2006.01)
    *F02M 61/20* (2006.01)
    *F02M 63/00* (2006.01)
    *F02M 61/10* (2006.01)
    *F16K 31/00* (2006.01)

(52) U.S. Cl.
    CPC ............ *F02M 61/10* (2013.01); *F02M 61/20* (2013.01); *F16K 31/007* (2013.01); *F02M 2200/50* (2013.01)

(58) Field of Classification Search
    USPC .................................................... 251/129.06
    See application file for complete search history.

(56) References Cited

U.S. PATENT DOCUMENTS

| | | | | |
|---|---|---|---|---|
| 5,031,841 A * | 7/1991 | Schafer | ................. | F02M 61/20 239/459 |
| 6,279,842 B1 * | 8/2001 | Spain | ................... | F02M 51/005 239/102.2 |
| 6,311,950 B1 * | 11/2001 | Kappel | .............. | F02M 51/0603 251/129.06 |
| 6,530,273 B1 * | 3/2003 | Gottlieb | ............. | F02M 51/0603 222/504 |
| 6,585,171 B1 * | 7/2003 | Boecking | ........... | F02M 51/0603 239/102.1 |
| 6,749,127 B2 * | 6/2004 | Lorraine | ............. | F02M 51/0603 239/5 |
| 6,892,956 B2 * | 5/2005 | Yildirim | ............ | F02M 51/0603 239/102.2 |
| 7,195,182 B2 * | 3/2007 | Fischer | .................. | F02M 61/08 239/533.1 |
| 7,458,531 B2 * | 12/2008 | Mochizuki | ........... | F02M 51/061 239/585.1 |
| 2004/0164175 A1 | 8/2004 | Maeurer et al. | | |
| 2007/0210189 A1 * | 9/2007 | Schurz | .................. | F02M 61/20 239/533.9 |
| 2008/0210788 A1 * | 9/2008 | Schurz | ............... | F02M 51/0603 239/585.1 |

FOREIGN PATENT DOCUMENTS

| | | |
|---|---|---|
| DE | 10 2009 026 532 | 12/2010 |
| DE | 10 2009 027 528 | 1/2011 |
| EP | 1 111 230 | 6/2001 |
| EP | 1 731 754 | 12/2006 |
| EP | 1 995 447 | 11/2008 |

* cited by examiner

VALVE FOR METERING IN A FLOWING MEDIUM

FIELD

The present invention relates to a valve for metering a flowing medium, in particular a fluid.

BACKGROUND INFORMATION

A conventional valve of this type, preferably used as a fuel injection valve (described in German Patent Application No. DE 10 2009 026 532 A1) has a valve housing, an outwardly opening valve needle having a closing head, and, for the actuation of the valve needle, a piezoelectric actuator that acts on the valve needle and a resetting element that acts on the valve needle. For the dosed injection of fuel, a metering opening situated in the fuel flow is surrounded by a valve seat that works together with the closing head in order to release and close the metering opening. The piezoelectric actuator lies against of the end of the valve needle remote from the closing head with a non-positive fit, and the point of action of the resetting element is situated close to the end of the valve needle remote from the closing head. The piezoelectric actuator has a piezo module made up of a multiplicity of piezoelectric elements that lie against one another, a so-called piezo stack, clamped between a terminating body and a terminating plate by a hollow element fashioned as a spring. The resetting element is a helical pressure spring situated concentric to the valve needle and supported at one side on a spring plate fastened on the end of the valve needle facing the actuator, and supported at the other side on the valve housing. When current flows through the piezoelectric actuator, the actuator lengthens, and displaces the valve needle against the force of the resetting spring, so that the closing head is lifted off from the valve seat and releases the metering opening. After the flow of current stops, the helical pressure spring that acts on the valve needle presses the closing head onto the valve seat so that the metering opening is closed.

SUMMARY

The present invention may have the advantage that due to the placement of the point of action of the resetting element close to the closing head, the stroke of the piezoelectric actuator required when the valve needle is actuated for a required stroke of the closing head can be made smaller. Because the stroke of the piezoelectric actuator is generally determined by the volume of the piezo stack, which is the most expensive part of the actuator to manufacture, the reduction of stroke reduces the volume of the piezo stack and therefore reduces the manufacturing costs for the actuator and valve.

The reduction of the required actuator stroke with unmodified stroke of the closing head for opening and closing the metering opening is achieved in that, as a consequence of the placement of the point of action of the resetting element on the closing head, or as close to the closing head as is possible given the structural conditions, a loss of stroke going back to the valve needle when the metering opening is closed becomes smaller. This loss of stroke arises as a result of elastic elongation of the valve needle in the closed state of the valve, which is a function of the resetting or closing force of the resetting element, the effective length of the valve needle between the closing head and the point of action of the closing force, the cross-sectional surface, and the modulus of elasticity of the valve needle. Due to the fact that the placement of the point of action makes the effective length of the valve needle significantly smaller, the stroke loss of the valve needle becomes smaller, and thus the stroke that is to be applied by the actuator in addition to the required stroke of the closing head also becomes smaller.

Advantageous developments and improvements of an example in accordance with the present invention are possible.

According to an advantageous specific embodiment of the present invention, the placement of the point of action of the resetting element on the valve needle is achieved in that the resetting element has a sleeve, and has a pressure spring acting on the sleeve with a pressure force directed toward the actuator. The sleeve has a sleeve shaft and has a flange standing out radially from the sleeve shaft, and is situated concentric to the valve needle and is connected fixedly to the valve needle with its end facing the closing head, at the point of action of the resetting element. An expansion of the sleeve that results when the valve is closed does not enter into the chain of action of the actuator, and does not result in any loss of stroke by the valve needle. The sleeve can be produced at low cost as a deep-drawn part or turned part, and as pressure spring a helical pressure spring is used that is situated concentric to the sleeve shaft, supported on the flange and fixed to the valve.

According to an advantageous specific embodiment of the present invention, the sleeve shaft has a shaft segment that has a smaller diameter and a shaft segment that has a larger diameter. The shaft segment having the smaller diameter is pushed onto the valve needle, largely with a positive fit, and is welded at its free end to the valve needle at the point of action of the resetting element on the valve needle, close to the closing head. The flange is integrally formed in one piece with the shaft segment having the larger diameter, at the free end thereof. This constructive realization of the resetting element achieves a compact design that saves constructive space. The valve needle and closing head are made in one piece, and the actuator lies immediately on the end of the valve needle remote from the closing head.

According to an equally advantageous alternative specific embodiment of the present invention, the placement of the point of action of the resetting element on the valve needle is achieved in that the resetting element is a shaft bellows that is fastened to the valve needle with one bellows end at the point of action of the resetting element on the valve needle, on or close to the closing head, surrounding a push rod that creates an operative connection between the valve needle and the actuator situated in a valve chamber sealed tightly against the medium, and with the other bellows end surrounds, in medium-tight fashion, a central opening of the valve chamber that is present for the guiding of the push rod through to the actuator. The conventional shaft bellows used to seal the medium-tight valve chamber that accommodates the actuator is thus assigned an additional function, namely that of the resetting element for the valve needle in order to press the closing head onto the valve seat. In this way, the same component is used for the sealing and resetting of the valve needle, so that a component is saved. Through the introduction of the push rod aligned with the valve needle, which lies with a non-positive fit on the end of the valve needle extending into the shaft bellows and on the actuator, a precise setting of force is possible despite the axial rigidity of the shaft bellows. The length of the push rod is paired, so that in the installed state the shaft bellows has the desired resetting or closing force.

According to an advantageous specific embodiment of the present invention, the push rod lies against the actuator and against the end of the valve needle remote from the closing head with, in each case, a non-positive fit, the support surfaces between the push rod and the valve needle on the one hand and between the push rod and the actuator on the other hand being fashioned as cardanic mounts. The cardanic mounting of the push rod ensures an actuation of the valve needle free of transverse forces.

BRIEF DESCRIPTION OF THE DRAWINGS

Below, the present invention is explained in more detail on the basis of exemplary embodiments shown in the figures.

DETAILED DESCRIPTION OF EXAMPLE EMBODIMENTS

Figure 1:
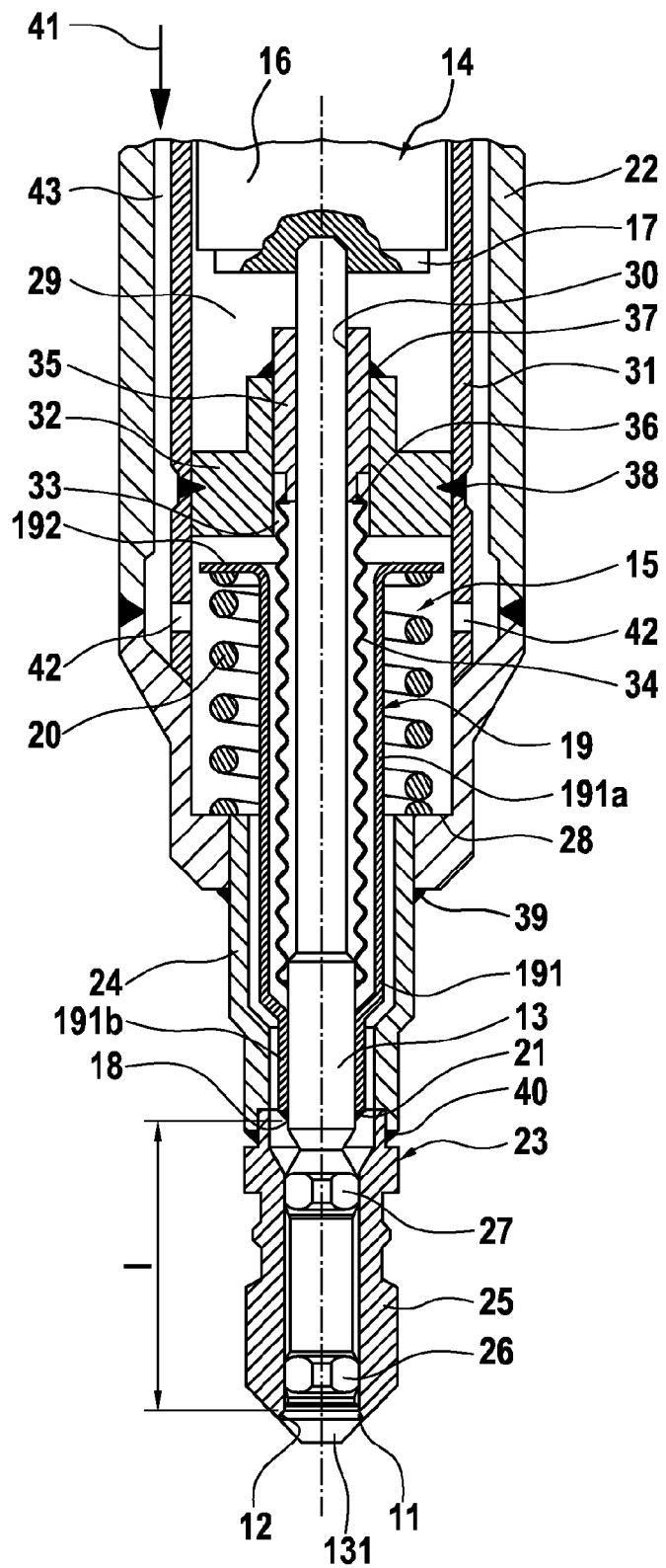
FIG. 1 shows a detail of a longitudinal section of a valve for metering a fluid.

The valve shown in longitudinal section in FIG. 1 for metering a flowing medium, in particular a fluid, is used for example as an injection valve for injecting fuel into the combustion cylinder of an internal combustion engine. FIG. 1 shows the longitudinal section of the injection end of the injection valve, the complete valve being presented and described for example in German Patent Application No. DE 10 2009 026 532 A1.

As main components, the valve has a metering opening 11, surrounded by a valve seat 12, situated in the fluid flow, and a valve needle 13 that controls the metering opening and that bears a closing head 131 that works together with valve seat 12 to close and release metering opening 11, the closing head preferably being made in one piece with valve needle 13, and has a piezoelectric actuator 14 that acts on valve needle 13 in order to release metering opening 11, and has an elastic resetting element 15 that acts on valve needle 13 to close metering opening 11. Piezoelectric actuator 14, of which only a part is shown in FIG. 1, has, in a known manner, an electrically controllable piezo module or piezo stack that is clamped, by a hollow element 16 fashioned as a spring, between a terminating plate 17 and a terminating body (cf. also German Patent Application No. DE 10 2009 026 532 A1).

The costs of the injection valve are generally determined by the piezo stack, the stroke of piezoelectric actuator 14 required for the valve actuation determining the volume of the piezo stack, which in turn significantly influences the cost of piezoelectric actuator 14 due to the use of noble metals for the electrodes. In addition to the stroke of closing head 131 required for the defined valve opening, piezoelectric actuator 14 must provide an additional stroke in order to compensate a so-called stroke loss of valve needle 13. This stroke loss Δl of valve needle 13, caused by an elongation of valve needle 13 in the closed state of the valve as a result of the closing or resetting force of resetting element 15 acting on valve needle 13, is a function of closing force F of resetting element 15, effective length $l_{eff}$ of valve needle 13 between closing head 131, or more precisely the surface of closing head 131 that acts on valve seat 12, and the point of action of resetting element 15 on valve needle 13, and the modulus of elasticity E and cross-section A of valve needle 13, according to:

$$\Delta l = \frac{F \cdot l_{eff}}{E \cdot A}$$

In order to minimize stroke loss Δl and thus to reduce the required stroke of piezoelectric actuator 14, and thus to achieve a significant cost reduction, as can be seen in FIG. 1 point of action 18 of resetting element 15 is situated on, or as close as possible to, the end of valve needle 13 bearing closing head 131. "As close as possible" is to be understood as meaning "as close as is permitted by the structural conditions in the valve."

In order to realize this, in the exemplary embodiment of FIG. 1 resetting element 15 has a sleeve 19 and has a pressure spring 20 that acts on sleeve 19 with a pressure force directed toward piezoelectric actuator 14. Sleeve 19 has a sleeve shaft 191 and a flange 192 that stands out radially from sleeve shaft 191. Sleeve 19 is situated concentric to valve needle 13 and is connected fixedly to valve needle 13 with its end remote from the flange at the point of action 18 of resetting element 15. Sleeve shaft 191 has a shaft segment 191a that is larger in diameter and that bears flange 192 at its end, and has a shaft segment 191b that is smaller in diameter and is pushed onto valve needle 13, lies thereon with a positive fit, and is welded to valve needle 13 at its free end remote from the flange, as indicated in FIG. 1 by weld seam 21. Pressure spring 20 is preferably a helical pressure spring situated concentric to sleeve shaft 191, supported on flange 192 in a manner fixed to the valve.

The components of the valve described above are integrated in a valve housing 22 and in a nozzle body 23 that is situated in valve housing 22 and that protrudes therefrom. Nozzle body 23, which is made with two parts in the exemplary embodiment of FIG. 1, has a hollow cylindrical valve insert 24 that is welded to valve housing 22, and has a valve seat bearer 25 welded onto the end of valve insert 24 remote from the valve housing, on which bearer valve seat 12 and metering opening 11 are fashioned. Valve needle 13 is guided in the hollow interior of seat bearer 25 with two gliding collars 26, 27 situated at a distance from one another, and is pressed onto valve seat 12, by the closing force of pressure spring 20, with its outwardly opening closing head 131, pressure spring 20, fashioned as a helical pressure spring, being supported between flange 192 of sleeve 19 and a radial shoulder 28 fashioned in valve housing 22. Alternatively or in addition, the support point, fixed to the valve, of pressure spring 20 can also lie on nozzle body 23, and here on valve insert 24.

Piezoelectric actuator 14, which is not resistant to fuel, is situated in a valve chamber 29 that is sealed against the medium. Valve needle 13 is guided, through a central opening 30, into valve chamber 29 up to piezoelectric actuator 14, and lies against terminating plate 17 of piezoelectric actuator 14 with a non-positive fit, under the action of pressure spring 20. Preferably, the seating of the end of valve needle 13 remote from the closing head on terminating plate 17 is realized as a cardanic mount. In order to seal central opening 30 for the guiding through of valve needle 13, a shaft bellows 34 is provided that, in shaft segment 191a having a larger diameter of flange sleeve 19, surrounds valve needle 13, the bellows being fastened on valve needle 13 with one bellows end in medium-tight fashion, and surrounding central opening 30 in medium-tight fashion with the other bellows end. As can be seen in FIG. 1, medium-type valve chamber 29 is formed by a tube 31 situated in valve housing 22, whose tube end facing nozzle body 23 is terminated in medium-tight fashion by an end piece 32 set into the tube end. In order to realize central opening 30 for valve chamber 29, end piece 32 has a central hole 33 into which a sliding socket joint 35 is set in medium-tight and immovable fashion, and in which valve needle 13 slides. The other bellows end of shaft bellows 34 is fastened on sliding socket joint 35. The fastening of shaft bellows 34 on sliding socket joint 35 is indicated in FIG. 1 by a weld seam 36, and the fastening of sliding socket joint 35 in end piece 32 is indicated by weld seam 37, and the fastening of end piece 32 in tube 31 is indicated by weld seam 38. The connection of valve housing 22 and valve insert 24 is represented by weld seam 39, and the connection of valve insert 24 and valve seat bearer 25 is represented by weld seam 40. The medium, i.e., the fluid or the fuel, flows from an inlet, symbolically indicated by arrow 41, through an annular gap 43 present between tube 31 and valve housing 22, and enters into nozzle body 23 via radial bores 42 situated in tube 31 outside valve chamber 29, which is sealed against the medium, where the fuel stands against closing head 131 under system pressure.

Figure 2:
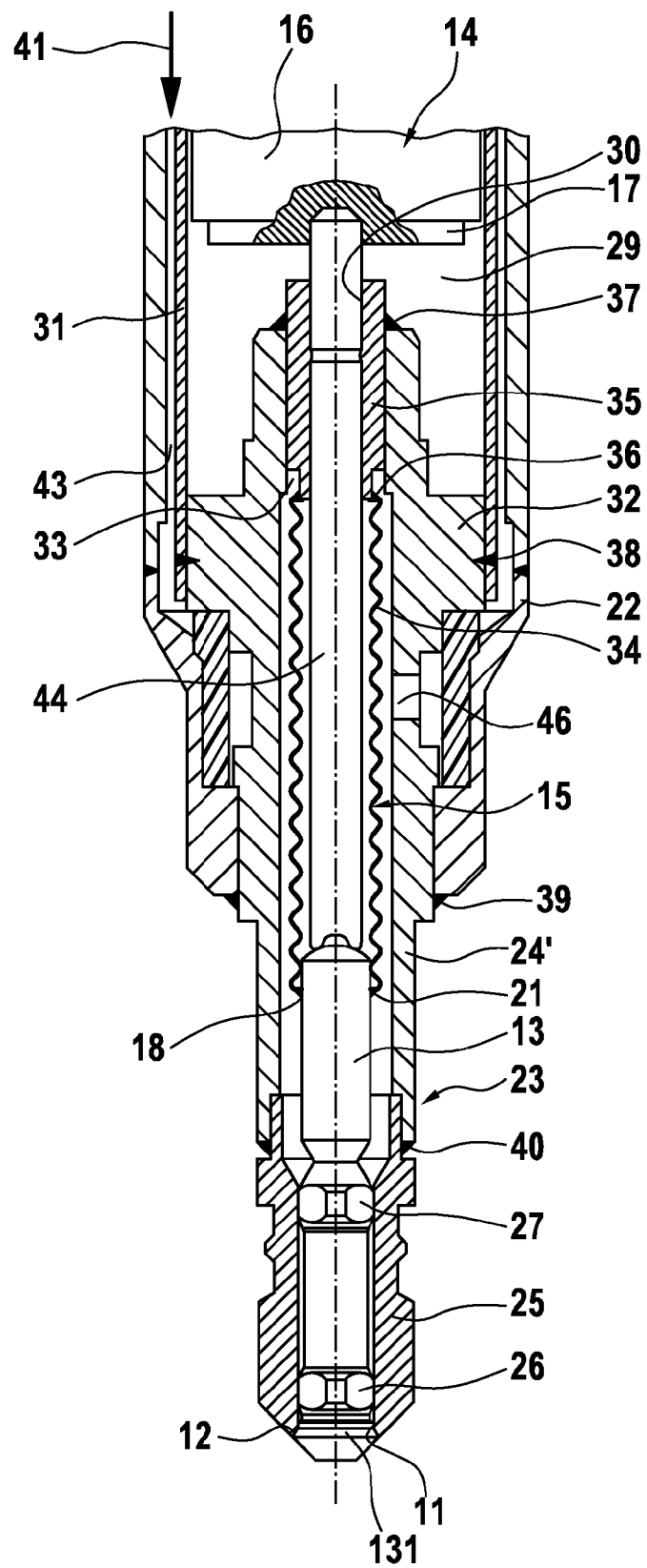
FIG. 2 shows a representation similar to that shown in FIG. 1, according to a further exemplary embodiment.

The valve shown partly in longitudinal section in FIG. 2 agrees largely with the valve described above, so that identical components have been provided with identical reference characters. This valve is modified in comparison to the valve described according to FIG. 1 in that the resetting element, made up of flange, sleeve, and pressure spring, is no longer present, and as resetting element 15 shaft bellows 34 is used, which is used to seal the access to valve chamber 29, which accommodates piezoelectric actuator 14 and is sealed against the medium. Metallic shaft bellows 34 is fastened in medium-tight fashion with one bellows end at the point of action 18 of resetting element 15 on valve needle 13, and with its other bellows end surrounds, in medium-tight fashion, central opening 30 of valve chamber 29, which is reserved for the access to piezoelectric actuator 14, so that here as well, in addition to its resetting function for closing head 131, it retains its sealing function. The operative connection between valve needle 13 and piezoelectric actuator 14 is produced by a push rod 44 that is situated in the interior of shaft bellows 34 and that is supported, with a non-positive fit in each case, on the one hand on the end of valve needle 13 extending into shaft bellows 34 and on the other hand on terminating plate 17 of piezoelectric actuator 14. Both support points are preferably realized as cardanic mounts, in order to achieve an operation of valve needle 13 free of transverse forces. Push rod 44 is paired in length, so that in the installed state the desired closing or resetting force of elastic shaft bellows 34 is set on valve needle 13.

As in the valve according to FIG. 1, valve chamber 29 that accommodates piezoelectric actuator 14 is formed by a tube 31 situated in valve housing 22, whose tube end facing nozzle body 23 is terminated in medium-tight fashion by end piece 32 that is placed into the tube end and that has central hole 33. Differing from the valve according to FIG. 1, end piece 32 is not a separate component, but rather is integrally formed in one piece on valve insert 24' of nozzle body 23. The medium-tight connection between tube 31 and end piece 32 is in turn produced by weld seam 38. A sliding socket joint 35 is placed into central hole 33 of end piece 32, and is connected tightly to end piece 32 by weld seam 37. The end of shaft bellows 34, terminating central opening 30 in medium-tight fashion, is situated on sliding socket joint 35 in medium-tight fashion by weld seam 36, and push rod 43 is accommodated in axially displaceable fashion in sliding socket joint 35. The flow of medium in valve housing 22 goes from the medium inlet, indicated by arrow 41, via annular gap 43, present between valve housing 22 and tube 31, and via radial bores 46 in valve insert 24' of nozzle body 23, to valve needle 13 and closing head 131.

What is claimed is:

1. A valve for metering a fluid flow, comprising:
   a metering opening situated in the fluid flow and surrounded by a valve seat;
   a valve needle that controls the metering opening, the valve needle having a closing head that works together with the valve seat to close and release the metering opening;
   a piezoelectric actuator that acts on the valve needle to release the metering opening; and
   an elastic resetting element that acts on the valve needle to close the metering opening;
   wherein a point of action of the resetting element on the valve needle is situated on or close to an end of the valve needle that bears the closing head,
   wherein the resetting element has a sleeve, wherein the sleeve has a sleeve shaft and a flange that stands out radially from the sleeve shaft,
   wherein the sleeve shaft has a shaft segment that is smaller in diameter and one that is larger in diameter, and the shaft segment that is smaller in diameter lies on the valve needle and is welded to an outermost surface of the valve needle at its free end, and wherein the outermost surface of the valve needle is located on an outermost circumference of the valve needle, and
   wherein the entire shaft segment that is smaller in diameter contacts the outermost surface of the valve needle.

2. The valve as recited in claim 1, wherein the resetting element has a pressure spring that acts on the sleeve with a pressure force directed to the actuator, the sleeve is situated concentric to the valve needle and is connected fixedly to the valve needle, at the point of action of the resetting element with its end facing the closing head.

3. The valve as recited in claim 2, wherein the pressure spring is a helical pressure spring that is situated concentric to the sleeve shaft and is supported on the flange.

4. The valve as recited in claim 1, wherein the flange is formed in one piece on the free end of the shaft segment that is larger in diameter.

5. The valve as recited in claim 1, wherein the valve needle and the closing head are fashioned in one piece, and the piezoelectric actuator lies with a non-positive fit on an end of the valve needle remote from the closing head.

6. The valve as recited in claim 5, wherein the valve seat and the metering opening are fashioned on a nozzle body that is fastened in a valve housing that accommodates the valve needle, actuator, and resetting element, and the pressure spring supported on the flange is further supported on at least one of the nozzle body and a radial shoulder fashioned in the valve housing.

7. The valve as recited in claim 6, wherein the actuator is situated in a valve chamber that is sealed against a medium, the valve needle is guided through a central opening into the valve chamber, and a shaft bellows that surrounds a segment of the valve needle is fastened in medium-tight fashion with one bellows end to the valve needle and with the other bellows end surrounds, in medium-tight fashion, the central opening to the valve chamber.

8. The valve as recited in claim 7, wherein the valve chamber is formed by a tube situated in the valve housing whose tube end facing the nozzle body is terminated in medium-tight fashion by an end piece that is set into the tube end and that has a central hole, and the central opening for the guiding through of the valve needle is realized with a sliding socket joint that guides the valve needle and that is set in medium-tight fashion in the central hole of the end piece, on which joint the other bellows end of the shaft bellows is fastened.

9. The valve as recited in claim 1, wherein the shaft segment that is smaller in diameter is welded directly to the valve needle at its free end.

* * * * *